Nov. 8, 1932.　　　S. HANSEN　　　1,887,409
HARROW TOOTH
Filed Oct. 19, 1931
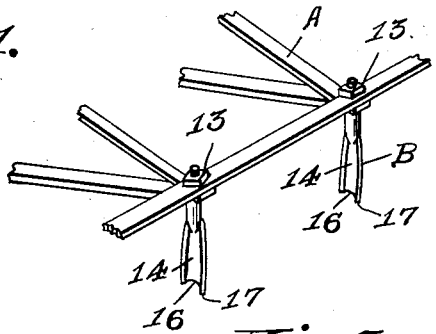
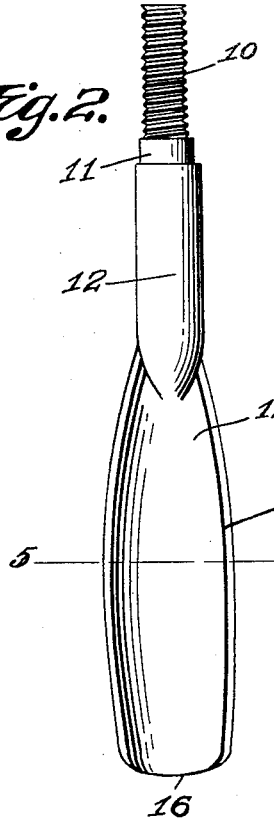
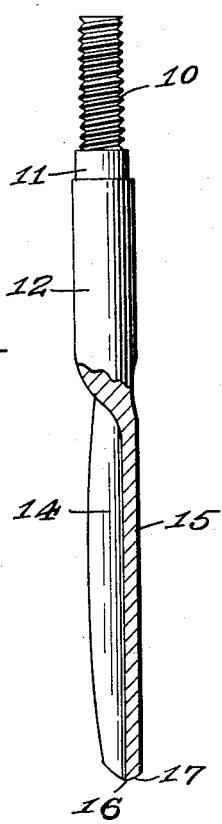
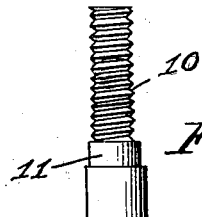
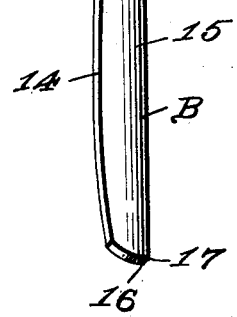
Soren Hansen,
INVENTOR
BY Victor J. Evans & Co.
ATTORNEY Patented Nov. 8, 1932

1,887,409

UNITED STATES PATENT OFFICE

SOREN HANSEN, OF BERWYN, ALBERTA, CANADA

HARROW TOOTH

Application filed October 19, 1931, Serial No. 569,773, and in Canada April 7, 1931.

This invention relates to improvements in harrow teeth and an object of the of the invention is to provide a strong, light and durable tooth for harrows.

A further object of the invention is to provide a tooth which will not so readily disturb the grain or other material through which it is drawn.

A still further object of the invention is to provide a tooth of this character simple in construction and which may be used on growing crops.

With these and other objects in view the invention consists essentially of a tooth formed with a threaded head, an intermediate shank portion and a tooth portion integral with the shank, formed with a convex front surface and a concave rearward surface, providing a light durable tooth of efficient character, as more fully described in the following specification and illustrated in the accompanying drawing which form part of the same.

In the drawing:

Figure 1 is a fragmentary perspective view illustrating the mounting of the harrow teeth.

Figure 2 is a rear elevation of one of the teeth.

Figure 3 is a side elevation of Figure 2.

Figure 4 is a similar view to Figure 3 with the tooth portion shown partly in section.

Figure 5 is a section on the line 5—5 of Figure 2.

In the drawing A indicates the harrow frame and B indicates the harrow teeth secured thereto. The harrow teeth as more particularly illustrated in Figures 2 and 3, comprise a screw-threaded head portion 10 which is stepped as at 11 to form the shank portion 12. The screw-threaded portion is adapted to extend through the harrow frame and to be rigidly secured thereto by means of nuts or the like 13, as illustrated in Figure 1.

In order to provide a very durable and light tooth I form the working or blade portion of the tooth concave at the rearward surface as at 14 with a corresponding convex forward portion 15. This will give the tooth the necessary rigidity and strength and at the same time less metal is used so that as a whole the harrow structure will be much lighter. The end of the blade or working portion is slightly curved as at 16, although this could be otherwise formed if desired, and the front portion of the tooth is bevelled as at 17 to provide the lower edge of the blade. Thus strength combined with lightness is a decided feature of the tooth and, due to the fact that the front portion of the tooth is convex, this permits the grain to fall in behind the tooth during operation without being disturbed to as great an extent as with any ordinary tooth. The rounded or curved end 16 of the tooth is essential because this specific construction prevents the grain from being pulled out and the germinated seed from being damaged in the use of the harrow.

Due to the lightness of construction the harrow can be used on growing crops since it does not penetrate very deep, until the grain is about a foot high.

Various modifications may be made in this invention without departing from the spirit thereof or the scope of the claim, and therefore the exact forms shown are to be taken as illustrative only and not in a limiting sense, and it is desired that only such limitations shall be placed thereon as are disclosed in the prior art or are set forth in the accompanying claim.

What I claim as my invention is:—

A tooth for harrows comprising a screw threaded head portion stepped therefrom, a shank portion, a blade portion on the shank formed with one surface concave and the opposite surface convex, said surfaces merging into a substantially curved lower edge, the convexed portion of the lower edge being beveled to provide on the front face of the same a sharpened lower beveled edge.

In testimony whereof I affix my signature.

SOREN HANSEN.